(12) United States Patent
McAuld

(10) Patent No.: US 10,304,423 B2
(45) Date of Patent: May 28, 2019

(54) ELECTRIC STRINGED GUITAR

(71) Applicant: FUSION MUSICTECH IP PTY LTD, Richmond, VIC (AU)

(72) Inventor: David McAuld, Richmond (AU)

(73) Assignee: FUSION MUSICTECH IP PTY LTD., Victoria (AU)

(\*) Notice: Subject to any disclaimer, the term of this patent is extended or adjusted under 35 U.S.C. 154(b) by 0 days.

(21) Appl. No.: 15/568,757

(22) PCT Filed: Apr. 22, 2016

(86) PCT No.: PCT/AU2016/000139
§ 371 (c)(1),
(2) Date: Oct. 23, 2017

(87) PCT Pub. No.: WO2016/168887
PCT Pub. Date: Oct. 27, 2016

(65) Prior Publication Data
US 2018/0218716 A1     Aug. 2, 2018

(30) Foreign Application Priority Data
Apr. 23, 2015  (AU) .................................. 2015901461

(51) Int. Cl.
*G10D 1/08* (2006.01)
*G06F 1/16* (2006.01)
(Continued)

(52) U.S. Cl.
CPC ........... *G10D 1/085* (2013.01); *G06F 1/1632* (2013.01); *G10H 1/32* (2013.01); *G10H 1/342* (2013.01);
(Continued)

(58) Field of Classification Search
CPC ........ G10D 1/085; G06F 1/1632; G10H 1/32; G10H 1/342; G10H 3/18; G10H 3/181; G10H 3/188; H04M 1/04
(Continued)

(56) References Cited

U.S. PATENT DOCUMENTS 3,194,870 A * 7/1965 Tondreau ............... G10D 1/085
84/726
3,296,916 A * 1/1967 Palmer ..................... G10H 3/18
455/66.1

(Continued)

FOREIGN PATENT DOCUMENTS

JP     2012027399 A      9/2010
JP     2012027399 A *    2/2012
(Continued)

OTHER PUBLICATIONS

IK Multimedia AmpliTube for Samsung Professional Audio [retrieved from internet on May 9, 2016] URL: http://www.kmultimedia.com/products/amplitubesapa, Published on Apr. 5, 2015 as per Wayback Machine.
(Continued)

*Primary Examiner* — David S Warren
*Assistant Examiner* — Christina Schreiber
(74) *Attorney, Agent, or Firm* — Tarolli, Sundheim, Covell & Tummino LLP

(57) ABSTRACT

The present indention provides a stringed musical instrument comprising; a substantially hollow body portion containing an audio system comprising an amplifier; at least one loudspeaker electrically connected to the audio amplifier; an audio interface for electrically connecting to a smart device and a power supply electrically connected to the audio system; a neck sub-assembly including: a neck; playing strings extending lengthwise along the neck; a bridge
(Continued)

attached to the neck over which the strings are stretched, and tensioning means by which the strings are held tensioned; and a docking station whereby, in use, a smart device may be removably secured to the instrument and electrically connected to the audio system.

15 Claims, 6 Drawing Sheets

(51) Int. Cl.
    *G10H 1/32* (2006.01)
    *G10H 1/34* (2006.01)
    *G10H 3/18* (2006.01)
    *H04M 1/04* (2006.01)
    *H04M 1/725* (2006.01)

(52) U.S. Cl.
    CPC .............. *G10H 3/18* (2013.01); *G10H 3/181* (2013.01); *G10H 3/188* (2013.01); *H04M 1/04* (2013.01); *G10H 2220/096* (2013.01); *G10H 2230/015* (2013.01); *H04M 1/72527* (2013.01)

(58) Field of Classification Search
    USPC .......................................................... 84/267
    See application file for complete search history.

(56) References Cited

U.S. PATENT DOCUMENTS

| | | | | |
|---|---|---|---|---|
| 3,696,700 A * | 10/1972 | Berardi | G10D 1/085 | 84/291 |
| 3,758,696 A * | 9/1973 | Miller | G10H 3/18 | 84/173 |
| 4,235,143 A * | 11/1980 | Hoexter | G10D 1/02 | 84/280 |
| 4,245,540 A * | 1/1981 | Groupp | G10H 3/26 | 84/726 |
| 4,312,258 A * | 1/1982 | Park | G10D 1/085 | 181/150 |
| 4,702,141 A * | 10/1987 | Bonanno | G10H 1/342 | 84/626 |
| 4,748,887 A * | 6/1988 | Marshall | G10H 1/0066 | 84/645 |
| 5,005,461 A * | 4/1991 | Murata | G10H 1/0016 | 84/470 R |
| 5,025,703 A * | 6/1991 | Iba | G10H 1/0091 | 84/678 |
| D338,682 S * | 8/1993 | Threadgill | D17/14 | |
| H001503 H * | 12/1995 | Threadgill | | 84/723 |
| H1503 H * | 12/1995 | Threadgill | | 84/723 |
| 5,567,896 A * | 10/1996 | Gottschall | G10D 3/02 | 84/294 |
| 5,744,744 A * | 4/1998 | Wakuda | G10H 1/36 | 84/610 |
| 5,837,912 A * | 11/1998 | Eagen | G10D 3/00 | 84/267 |
| 5,889,221 A * | 3/1999 | Dejima | G10D 1/085 | 84/267 |
| 5,929,362 A * | 7/1999 | Oteyza | G10D 1/085 | 84/293 |
| 6,025,548 A * | 2/2000 | Ehrlich | G10D 1/08 | 84/267 |
| 6,605,765 B1 * | 8/2003 | Johnson | G10D 1/00 | 84/267 |
| 6,696,632 B2 * | 2/2004 | Minakuchi | G10H 1/32 | 84/290 |
| 6,791,022 B2 * | 9/2004 | Green | G10D 1/085 | 84/290 |
| 7,355,110 B2 * | 4/2008 | Nash | G10H 1/32 | 84/267 |
| 7,442,865 B2 * | 10/2008 | Moghaddam | G10D 1/085 | 84/267 |
| 7,754,961 B1 * | 7/2010 | Yang | A63F 13/06 | 273/148 B |
| D623,181 S * | 9/2010 | Mattie | D14/300 | |
| 8,093,486 B2 * | 1/2012 | Behringer | G10H 1/0008 | 84/615 |
| 8,389,835 B2 * | 3/2013 | Findley | G10H 1/32 | 84/267 |
| 8,481,832 B2 * | 7/2013 | Lloyd | G06F 1/1632 | 361/679.41 |
| 9,093,057 B2 * | 7/2015 | Mejia | G10H 1/02 | |
| 9,117,431 B1 * | 8/2015 | Rudes | G10H 1/32 | |
| 9,286,872 B2 * | 3/2016 | Packouz | G10H 3/186 | |
| D759,746 S * | 6/2016 | Mangano | D17/20 | |
| 9,786,260 B2 * | 10/2017 | Fishman | G10D 1/085 | |
| 2003/0019349 A1 * | 1/2003 | Green | G10D 1/085 | 84/731 |
| 2003/0196542 A1 * | 10/2003 | Harrison, Jr. | G04B 25/00 | 84/737 |
| 2004/0244566 A1 * | 12/2004 | Steiger | G10H 1/0016 | 84/610 |
| 2005/0183566 A1 * | 8/2005 | Nash | G10H 1/32 | 84/601 |
| 2005/0211081 A1 * | 9/2005 | Bro | G10H 1/18 | 84/737 |
| 2006/0000347 A1 * | 1/2006 | Preece | G10H 1/36 | 84/741 |
| 2007/0234880 A1 * | 10/2007 | Adams | G10H 1/0066 | 84/601 |
| 2008/0184864 A1 * | 8/2008 | Holt | G10H 3/186 | 84/267 |
| 2012/0194994 A1 * | 8/2012 | Lloyd | G06F 1/1632 | 361/679.41 |
| 2014/0373702 A1 * | 12/2014 | Huang | G10H 3/181 | 84/735 |
| 2018/0218716 A1 * | 8/2018 | McAuld | G10H 3/18 | |

FOREIGN PATENT DOCUMENTS

| | | |
|---|---|---|
| WO | 2009/036588 A1 | 3/2009 |
| WO | 2012/058497 A1 | 5/2012 |

OTHER PUBLICATIONS

Extended European Search Report for Application No. 16782391.3-1210/3286754 PCT/AU2016000139, dated Aug. 9, 2018.

* cited by examiner

ELECTRIC STRINGED GUITAR

TECHNICAL FIELD

This invention concerns the construction of stringed musical instruments, especially electric stringed musical instruments. It particularly concerns electric guitars, but the invention in its broadest sense may be applied to instruments other than guitars.

BACKGROUND

The sound from an electric stringed instrument starts with metallic strings vibrating near a pickup. Pickups are essentially magnetic coils, each consisting of a small magnet wrapped in fine copper wire. When a metallic object (such as an electric guitar string for example) is vibrated above the magnetic coil, the magnetic field is disturbed and an electrical current is produced. This current passes from the pickup to the instrument's output jack and then to an amplifier and speaker to produce the sound associated with the electric instrument.

Accordingly, a traditional electric guitar setup requires:
An electric guitar;
An amplifier and speakers;
Guitar cable from guitar to amplifier;
Mains power lead from amplifier to power outlet; and optionally
Effects pedals or board with power supply cables.

Since the introduction of smart devices, and in particular the Apple iPhone™, software developers began producing 'guitar apps' which are software programs able to process and record the output signal from an electric guitar. Guitar apps are used in conjunction with a guitar audio interface, which is an electronic hardware device that facilitates electrical connection of a guitar to smartphone. The output cable which normally couples the electric guitar to an amplifier is instead coupled to the guitar audio interface and the guitar audio interface has an output cable or dock connector which is coupled to the smart device. There is typically an audio out electrical connection on the guitar interface to electrically connect to either headphones or an audio amplifier.

One of the core functions of guitar apps is to process the signal from the guitar before it is sent to an amplifier or headphones. Signal processing can be used to accurately recreate the sound or tone (timbre) of classic amplifiers such as those produced by Fender or Marshall, or the sound or tone of guitar effect pedals to produce, for example echo/digital delay, revert, distortion, phaser etc.

Some of the functions provided by guitar apps include; amplifier simulation/modelling; guitar effects pedal simulation/modelling; speaker cabinet, simulation/modelling; multi-track recording and audio editing; song or backing track playback using songs stored on the smart device; and drum sequencing.

The advantage and appeal of the new guitar apps that all of this functionality is now contained on the user's smart device and is thus highly portable. When combined with an audio amplifier and speakers, guitar apps effectively turn a smartphone into a full electric guitar setup and recording studio. Before the introduction of guitar apps all of this functionality would have had to be provided by traditional guitar hardware such as guitar amplifiers, effects pedals, and the like, connected to a computer which is running audio editing software programs.

Although guitar apps allow the user to do away with a number of components from the electric guitar setup, thus making a more portable setup, it is still an inconveniently large amount of equipment to transport. The present invention seeks to provide an improved musical instrument which overcomes at least some of the remaining difficulties.

SUMMARY OF INVENTION

Accordingly, the present invention provides a stringed musical instrument comprising:
a substantially hollow body portion containing:
   a. an audio system comprising an amplifier,
   b. at least one loudspeaker electrically connected to the audio system
   c. an audio interface for electrically connecting to a smart device, and
   d. a power supply electrically connected to the audio system,
a neck sub-assembly including:
   a. a neck,
   b. playing strings extending lengthwise along the neck,
   c. at least one pickup adjacent to the strings and attached to the neck,
   d. a bridge, attached to the neck, over which the strings are stretched, and
   e. tensioning means attached to the neck, by which the strings are held taut, and
a docking station whereby, in use, a smart device may be removably secured to the instrument and electrically connected to the audio interface.

Preferably, the body portion includes an external shell in which the audio system, loudspeaker, audio interface and power supply are housed.

Preferably, the docking station comprises a recess forming part of an outer wall of the body portion. Preferably, within the recess there is an electrical connector suitable for connection, directly or indirectly, with a smart device. Preferably, the docking station also comprises an adaptor the outer surface of which is engagable with the recess and the inner surface of which is engagable with the smart device.

Preferably, the neck sub-assembly extends into the body portion. Preferably, the neck sub-assembly is connected to the body portion through a vibration dampener.

Preferably, the loudspeaker is connected to the body portion through a vibration dampener.

Preferably, the loudspeaker is retained within a speaker housing which is connected to the body portion through a vibration dampener.

Preferably, the vibration dampener comprises resilient elastomeric pads. The vibration dampener may comprise, for example, polyurethane foam rubber, silicone foam or similar, natural or synthetic foam rubber. Alternatively the vibration dampener could be solid elastomeric material such as natural rubber or synthetic rubber for example ethylene propylene rubber, EPDM rubber, neoprene rubber, silicone rubber, thermoplastic elastomer, or thermoplastic polyurethane rubber.

Optionally, the musical instrument comprises a wireless connection for wirelessly communicating with the smart device whereby the smart device may be used to control the musical output of the instrument.

The musical instrument is preferably, a portable electric guitar. The term "electric guitar" is intended to include an "electric bass guitar".

A particular embodiment of the electric stringed instrument described herein is an electric guitar that incorporates within its body portion: an, audio system, a loudspeaker, an audio interface and a power supply. The capability of connecting the instrument of the present invention to a smart device, containing guitar apps, provides the user with a portable stringed instrument which in effect has a full electric guitar setup, a recording studio, an audio system and one or more loudspeakers integrated within the instrument which the user can easily take and use anywhere.

A further embodiment of the electric stringed instrument described herein is an electric guitar that further incorporates within its body portion a second loudspeaker that is oriented upwardly toward the head of the instrument player and will allow the player to experience the full spectrum of audio frequencies emitted by the instrument.

When playing a regular electric guitar, the sound comes from a box in the corner of the room because the amplifier is remote from the guitar. With an electric guitar according to the present invention, the sound comes directly from the instrument and you feel a much stronger sense of power and connection to the instrument.

The present invention further provides a method of assembling a stringed musical instrument comprising joining: (i) a substantially hollow body portion containing an audio system comprising an amplifier; at least one loudspeaker electrically connected to the audio amplifier; an audio interface for electrically connecting to a smart device and a power supply electrically connected to the audio system; and (ii) a neck sub-assembly including: a neck; playing strings extending, lengthwise along the neck; a bridge attached to the neck over which the strings are stretched, and tensioning means by which the strings are held tensioned; wherein: a. a proximal end of the neck sub-assembly is substantially received within the body portion and connected thereto by a vibration dampener; and b. the loudspeaker is retained within a speaker housing and the speaker housing is connected to the body portion by a vibration dampener; and c. the vibration dampener comprises one or more resilient elastomeric pads.

Where the terms "include", "includes", "included" or "including", "comprise", "comprises", "comprised" or "comprising" are used in this specification, they are to be interpreted as specifying the presence of the stated features, integers, steps or components referred to, but not to preclude the presence or addition of one or more other feature, integer, step, component or group thereof.

BRIEF DESCRIPTION OF DRAWINGS

In order that, the present invention may be readily understood and put into practical effect, reference will now be made to the accompanying illustrations, wherein like reference numerals refer to like features and wherein.

DETAILED DESCRIPTION OF INVENTION

Figure 1:
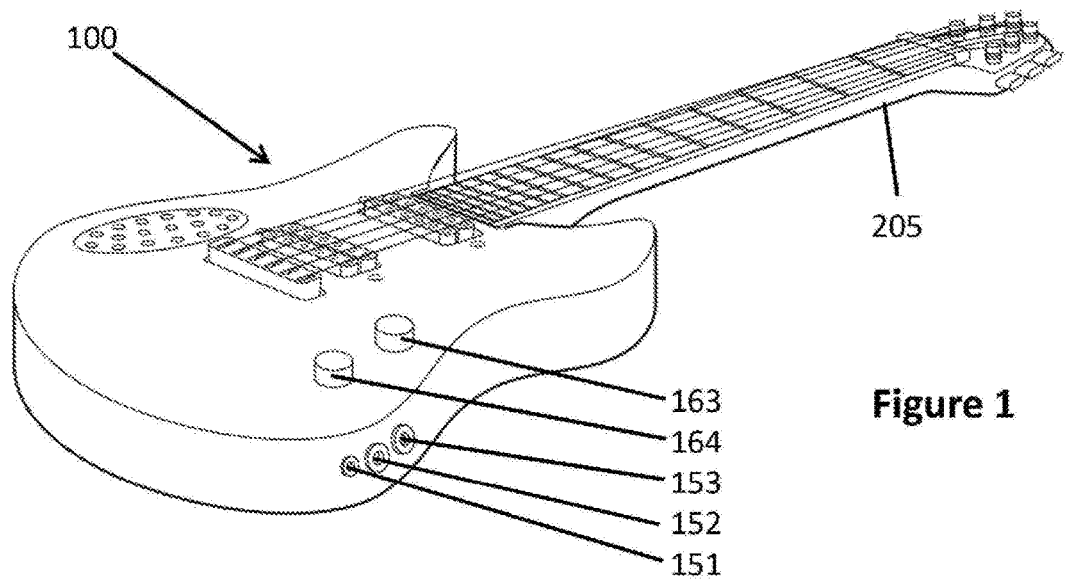
FIG. 1 is view of a guitar according to an embodiment of the present invention.
Figure 2:
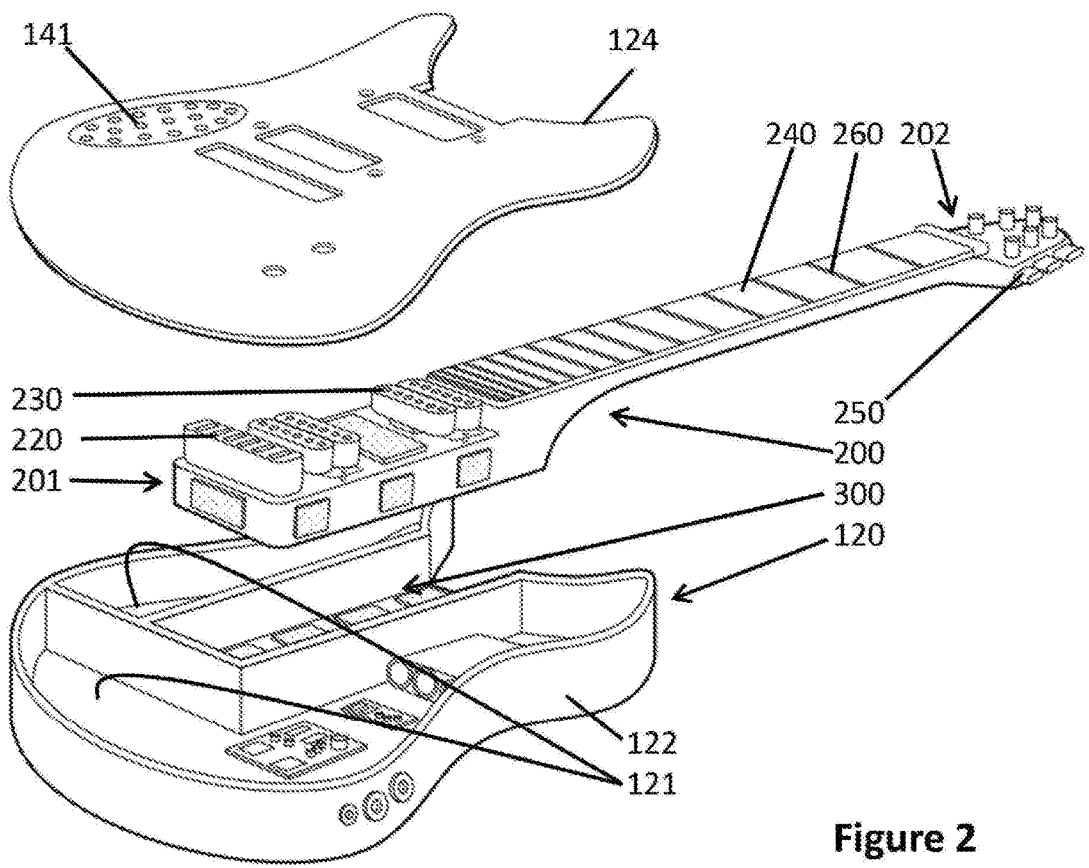
FIGS. 2 and 3 are exploded views of the body portions of electric guitars according to embodiments of the present invention.
Figure 3:
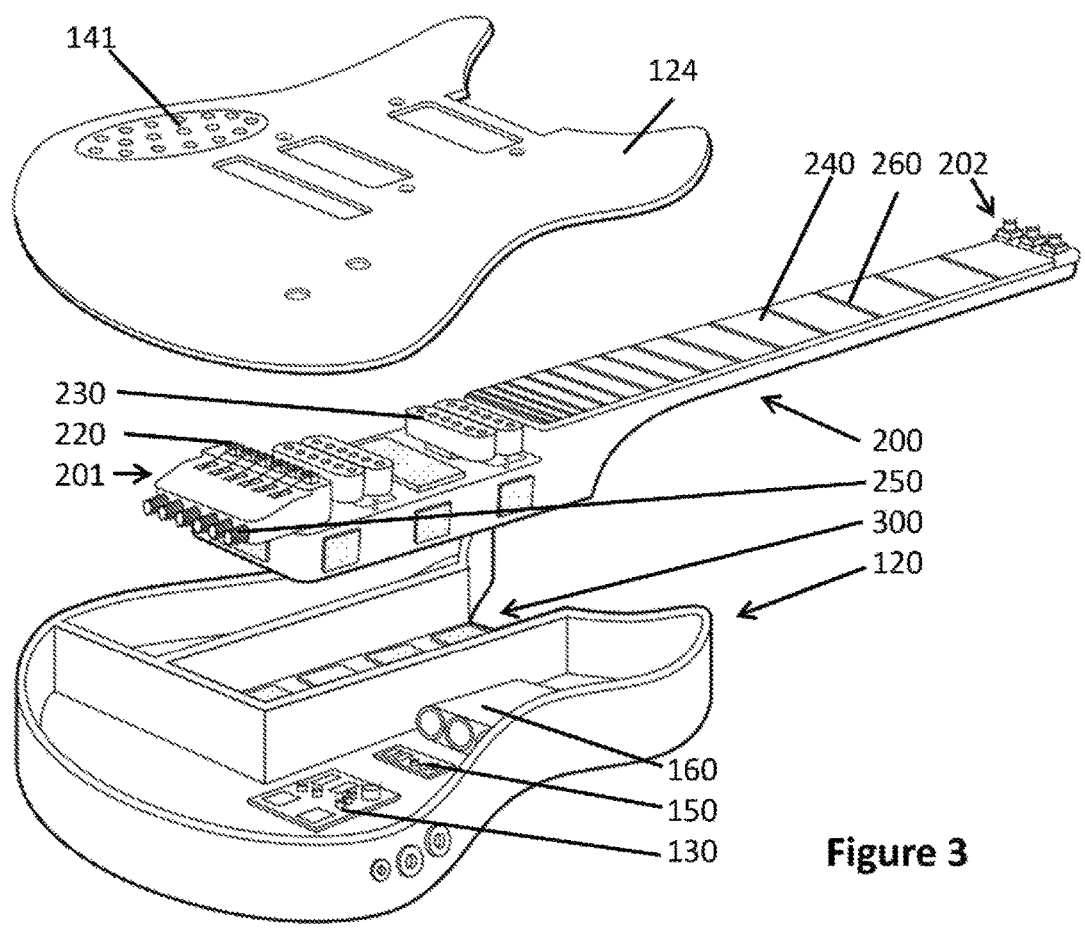
Figure 4:
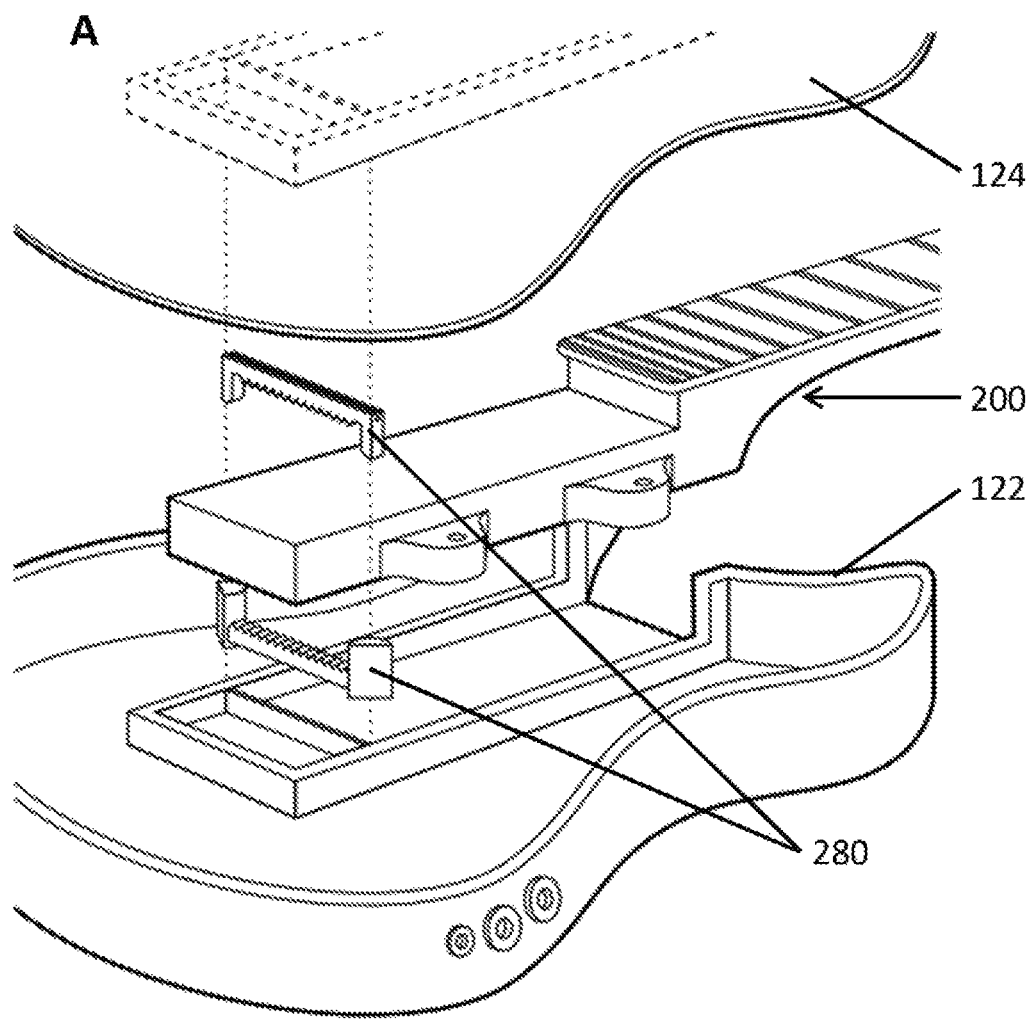
FIG. 4 shows (A. perspective view; B. cross-sectional view) the attachment of the neck sub-assembly to the body portion according to an embodiment of the present invention.
Figure 4:
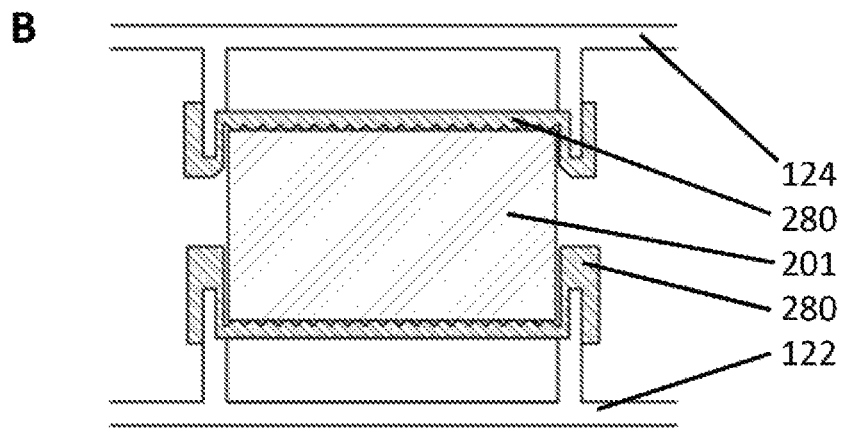
Figure 5:
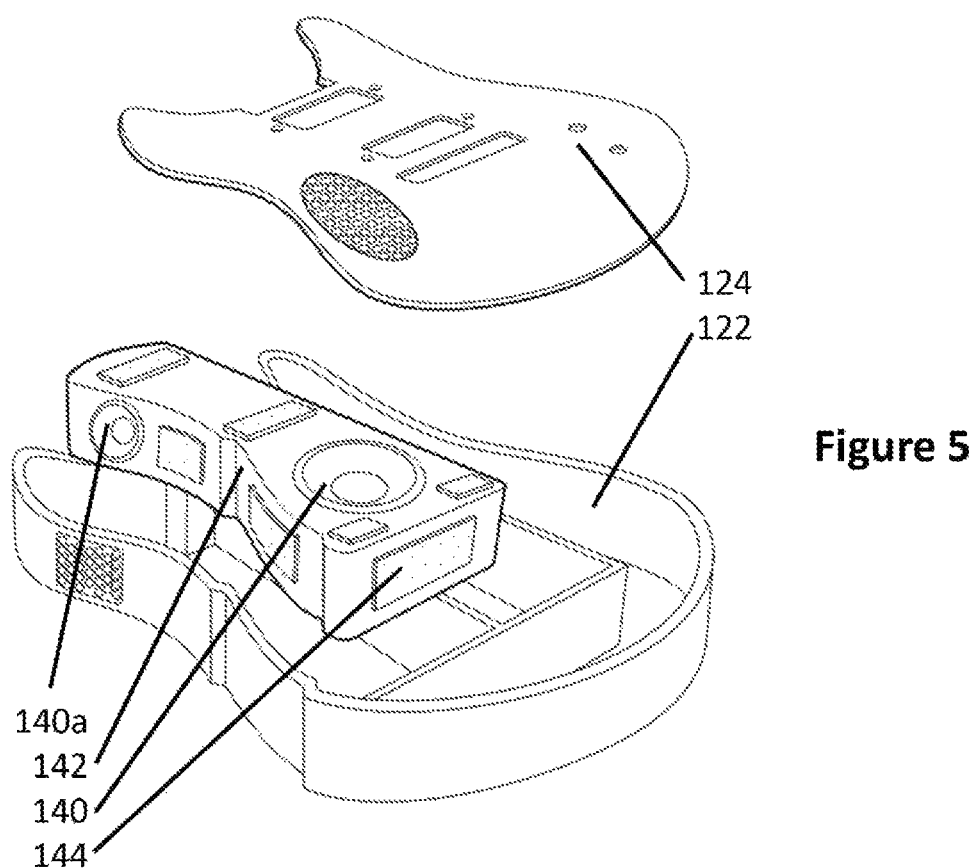
FIG. 5 is an exploded view of the body of an electric guitar according to an embodiment of the present invention, showing the speaker box.
Figure 6:
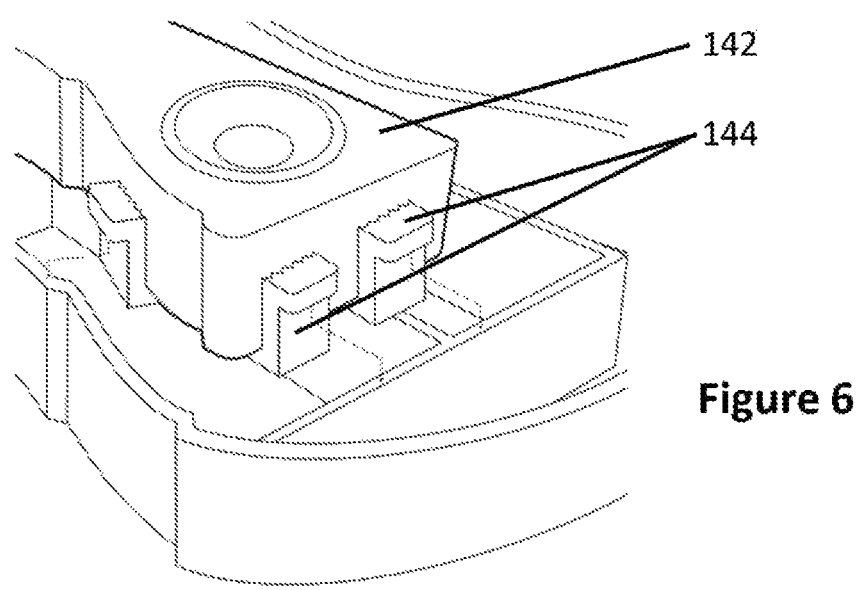
FIG. 6 shows another embodiment of the present invention, detailing an alternative form of vibration dampener for use with a speaker box.
Figure 7:
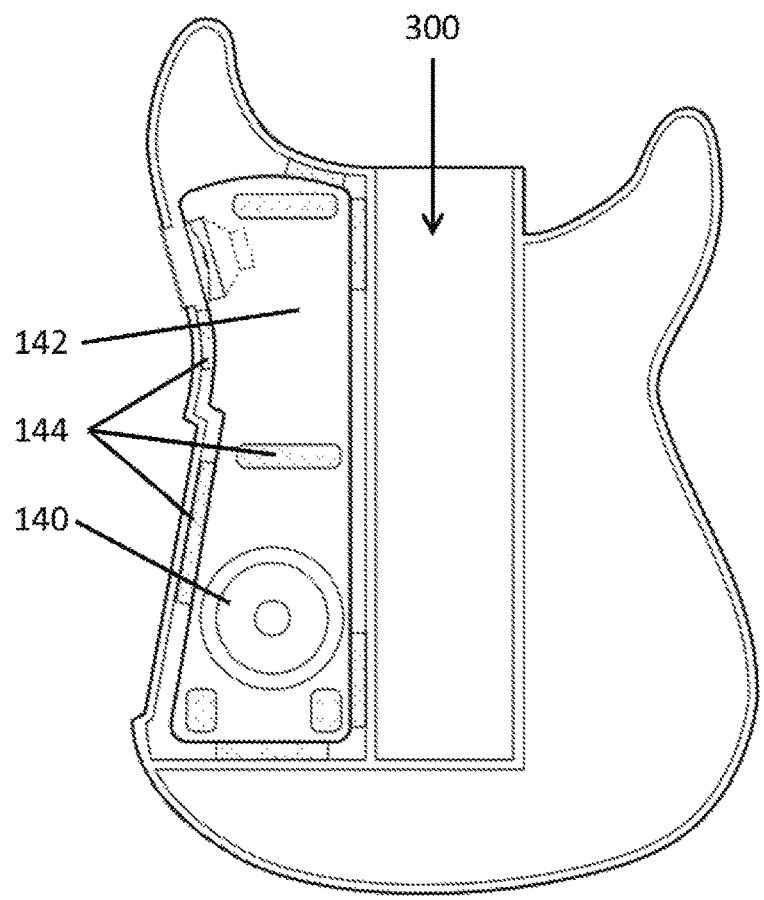
FIG. 7 shows the arrangement of the speaker box within the body portion of an electric guitar according to an embodiment of the present invention.

The present invention provides an improved electric stringed instrument that incorporates within its body portion, an audio system, a loudspeaker, an audio interface and a power supply.

While this invention is directed to all types of electric stringed instruments, the following description will focus predominantly on electric guitars; however this is not to be taken as a restriction of the invention to electric guitars. The invention is equally applicable to all types of electric stringed instruments, including, but not limited to: violins; violas; cellos; guitars, including bass guitars; banjoes: and ukuleles.

As used herein, the term "smart device" is used to refer a portable electronic computing device, that can operate to some extent interactively and autonomously. Examples of "smart devices" include iPod™, iPhone™ or iPad™, as made by Apple Corporation, as well as other corresponding devices manufactured by other companies wherein the devices offers generally similar functionality.

The stringed musical instrument described herein has a substantially hollow body portion defining an interior space, at least one string on the neck and at least one pickup adjacent to the string which converts vibrations of the string to electrical signals. Electrical signals produced by the pickup are routed to an audio interface contained within the body which may convert the pickup's analogue electrical signal into a form suitable for input to the smart device. The signal to be inputted to the smart device from the audio interface is preferably digital but may also be analogue.

Integral with an outer surface of the body portion of the instrument is a docking station for secure attachment and/or electrical/data connection of the smart device, in certain embodiments of the present invention, the smart device may be connected to the docking station via a cable, without the smart device being releasably secured within the docking station. Such an arrangement may be necessary if the smart device cannot be secured to the docking station, for example, an iPad™ may be too large to fit within the docking station. The smart device preferably, runs software in the form of guitar apps which facilitate processing, modification, recording and/or playback of the signals emanating from the instrument pickups. Additionally housed within the body of the musical instrument are: an audio system comprising an audio amplifier; an audio interface; at least one loudspeaker; and a power supply.

In particular embodiments of the invention, the docking station may be positioned on an outer edge of the body portion, whereby when a smart device is docked within the docking station, a display screen of the smart device is readily viewable by the player of the instrument. Such an arrangement has the advantage of allowing the player to readily interact with the smart device while playing the instrument. For example, in the case of an electric guitar according to the present invention, the docking station may be located on the forward bout or the rear bout.

In use, the electrical output from the pickups is directed to the smart device, via the audio interface which converts the analogue signal (from the pickups) into a digital or analogue signal suitable for processing by the smart device. The processed digital or analogue signals exiting from the smart device are then convened back into an analogue form suitable for amplification by the amplifier part of the audio system. The purpose of the audio system is to amplify the audio signal sourced either directly from the instrument pickups or to amplify the processed audio signal exiting from the smart device. The amplified audio signal is then routed to the at least one loudspeaker and/or to a headphone outlet situated on the body portion of the instrument. The integration of the smart device and audio system with the electric stringed instrument creates a new "smart" instrument which is effectively a portable recording studio and full electric instrument setup.

A preferred feature of the instrument described herein is the provision of analogue to digital and digital to analogue signal processing to convert the analogue electrical signal from the pickup into a format suitable for input into the smart device and also to convert a digital signal exiting from the smart device to an analogue form that is suitable for input into the audio amplifier housed within the body of the instrument. These signal conversions are facilitated by the audio interface.

An optional feature of the instrument described herein is the provision of one or more electrical switches located on the body portion which connect to and send activation signals to a wireless communication device contained within the body portion of the instrument. The wireless communication device transmits a radio frequency signal which can be received by the smart device attached to the instrument. The activation information transmitted in this signal facilitates control, by the use of these switches, of certain functionality within the guitar app software running on the smart device.

The mode of wireless communication may be any that is capable of being used by the smart device including, but not limited to: Near Field Communication (NFC), Wi-Fi and/or Bluetooth™.

If wireless communication is used, the smart device may not necessarily be located in the docking station. Further, in certain alternative embodiments, the wireless communication device may not be located within the body portion of the instrument. In such cases, it is envisaged that an external wireless communication device could be attached to the docking station to provide the wireless capability to the instrument.

The electric stringed instrument shown in the Figures is an electric guitar 100 comprising two main sub-assemblies, namely a substantially hollow body portion 120 and a neck sub-assembly 200.

In the illustrated embodiment, the body portion is constructed from a base 122 and lid 124 forming two external shell portions which are mechanically joined or bonded together, preferably, using adhesive. The external shell portions may be constructed from wood, or from injection or compression moulded thermoplastic polymer or thermoset polymer, or be thermoformed from thermoplastic, or constructed from some similar material and forming process. The assembled body portion 120 defines interior spaces 121. Within the interior spaces 121 of the body portion 120 are contained the audio system 130, loudspeaker 140, audio interface 150 and power supply 160.

The body portion 120 may also include traditional electric guitar components such as guitar jack connector 152, pickup volume control 161 and amplifier volume control 164.

Contained within the substantially hollow body portion 120 is the audio system. As noted above, the purpose of the audio system is to facilitate amplification of the audio signal produced by the guitar pickups and/or the audio signal sent from a connected smart device. The amplified signal can then be sent to the internal loudspeaker 140 or to headphones via a headphone jack socket 151. Although only two loudspeakers 140,140a are shown in the illustrated embodiments, additional speakers may be incorporated. A speaker grille 141 is located in the lid 124 in line with the loudspeaker 140.

In particular embodiments of the present invention, the instrument may include a plurality of loudspeakers. In some embodiments, the different loudspeakers may be directed outwardly towards a listener and each loudspeaker may handle different ranges of frequencies. In other embodiments, a loudspeaker may be directed towards the player, as discussed in detail below. Accordingly, the arrangement of loudspeakers in the instrument is not to be restricted to the embodiment illustrated in the accompanying figures.

Associated with the audio system is an audio interface which communicates with the smart device by transmitting the signal from the guitar pickups to the smart device and then transmitting the signal from the smart device to the audio system.

The audio system 130 comprises an audio amplifier, which may have a volume control, for driving the one or more loudspeakers. The audio system 130 and audio interface 150 may be combined onto a single printed circuit board (PCB); this main PCB may also contain traditional electric guitar controls for pickup volume 163 and amplifier volume 164.

The at least one loudspeaker 140 may be housed within a speaker enclosure 142, which is, in effect, a hollow box. The loudspeaker 140 is preferably, fixed onto an outside surface of the speaker enclosure 142 by screws or bolt type fasteners or with adhesive and with the main body of the loudspeaker extending through an aperture in the speaker enclosure 142. Once in place, the loudspeaker 140 effectively seals the speaker enclosure 142. In certain embodiments, a vibration dampener is located between the loudspeaker and the speaker enclosure to attenuate vibration of the speaker enclosure by the operating loudspeaker, as discussed further below. The vibration dampener may comprise, for example, polyurethane foam rubber, silicone foam or similar, natural or synthetic foam rubber. Alternatively the vibration dampener could be solid elastomeric material such as natural rubber or synthetic rubber for example ethylene propylene rubber, EPDM rubber, neoprene rubber, silicone rubber, thermoplastic elastomer, or thermoplastic polyurethane rubber.

The speaker enclosure 142 may also incorporate a passive radiator (not shown). Such a passive radiator component is in effect a loudspeaker diaphragm which has no voice coil but is a passive audio device which is not electrically powered. Its purpose is to amplify the effect of the vibrating loudspeaker diaphragm. As the speaker enclosure is a sealed box the internal pressure produced by the moving loudspeaker diaphragm induces movement in the passive radiator diaphragm thus amplifying the sound produced by the loudspeaker.

To further attenuate vibration of instrument components as a result of the vibrating loudspeaker(s) 140, the speaker enclosure 142 may be isolated from the body portion 120 by the use of a vibration dampener 144. The vibration dampener 144 may comprise, for example, polyurethane foam rubber, silicone foam or similar, natural or synthetic foam rubber. Alternatively, the vibration dampener 144 could be solid elastomeric material such as natural rubber or synthetic rubber for example ethylene propylene rubber, EPDM rubber, neoprene rubber, silicone rubber, thermoplastic elastomer, or thermoplastic polyurethane rubber. The effect of the isolation of the speaker enclosure 142 from the body portion 120, facilitated by the vibration dampener 144, is to attenuate the transmission of vibrations induced in the speaker enclosure 142 by the loudspeaker(s) 140 to the body portion 120. The accompanying figures illustrate alternative forms of vibration dampener. The purpose of vibration attenuation is to reduce or eliminate the audio feedback as discussed further below.

Also housed within the substantially hollow body portion 120 is a power supply 160 which is used for powering the electrical components of the instrument, namely the audio system 130 and audio interface 150. The power supply may also be used to power and/or charge a smart device connected to the instrument. The instrument may also include an indicator, on its outer surface or via the smart device, which provides an indication of the charge level of the power supply. Preferably, the power supply is a rechargeable battery, optionally selected from: nickel cadmium (NiCd) battery; nickel-metal hydride (NiMH) battery; lithium, ion battery; and lithium polymer battery.

Also embedded with the power supply or the main PCB (printed circuit board) may be a charging, logic circuit that regulates charging of the power supply to ensure correct charging and longevity of the power supply. Recharging of the power supply may be achieved through either a physical, inductive, or other wireless connection.

Construction of an electric guitar which uses an injection or compression moulded body shell and which has a traditional bolt-on guitar neck faces a significant problem. The forces applied to the assembled neck and body by tension from the guitar strings can be over 200 pounds (90 kg). This force acts on the material of the moulded body and results in distortion and bending of the body shell components. This distortion and bending of the moulded body results in a loss of string tension which causes the guitar strings to lose their correct pitch. Even if the player manages to tune the guitar strings to the required tension the flexibility of the molded body will result in unstable string tension and whenever the guitar player moves the guitar the string tension will be affected causing the guitar to go out of tune.

A particular embodiment described herein incorporates a novel solution to overcome this problem. The neck 205 is provided in the form of a neck sub-assembly 200 that carries the strings, bridge 220, pickups 230, fingerboard 240 and tuning mechanism 250. The neck sub-assembly 200 thereby takes all of the loading from the tensioned strings and no string tension loads are applied to the body portion 120. The neck sub-assembly 200 preferably, extends substantially into the body portion 120 of the instrument 100. For example, the proximal end 201 of the neck sub-assembly, bearing at least the bridge 220 and pickups, is substantially within the body portion 120 of the instrument 100, and the distal end 202 of the neck sub-assembly 200, bearing at least the fingerboard 240, is not within the body portion 120 of the instrument 100.

The use of a separate neck sub-assembly 200 also allows the neck 205 to be made of traditional materials, such as timber. This then allows the instrument to perform and sound more like a traditional instrument in terms of sound and timbre, by providing a natural resonance that is difficult to achieve with man-made materials.

The neck sub-assembly 200 has (i) a distal end 202, with a fingerboard 240 which includes a plurality of frets 260 which are permanently fixed thereto; and (ii) a proximal end 201 which includes the bridge 220. Typically, the pickups 230 are located between the bridge 220 and the fingerboard 240. In some embodiments, a tuning tailpiece 250 is located at the proximal end 201 of the neck sub-assembly 200. In alternative embodiments, tuning pegs are located at the distal end 202 of the neck sub-assembly 200, in what is the "usual" location. The proximal end 201 of the neck sub-assembly 200 is received within a blind passage 300 in the body portion 120. The blind passage 300 allows the proximal end 201 of the neck sub-assembly 200 to be received within the body portion 120 of the instrument 100. There is a plurality of strings running in line with the neck 205; the strings extend between the proximal 201 and distal 202 ends of the neck sub-assembly 201). Near the proximal end 201 of the neck sub-assembly 200 is the bridge 220, which is connected to the proximal end 201 of the neck sub-assembly 200.

Figure 8:
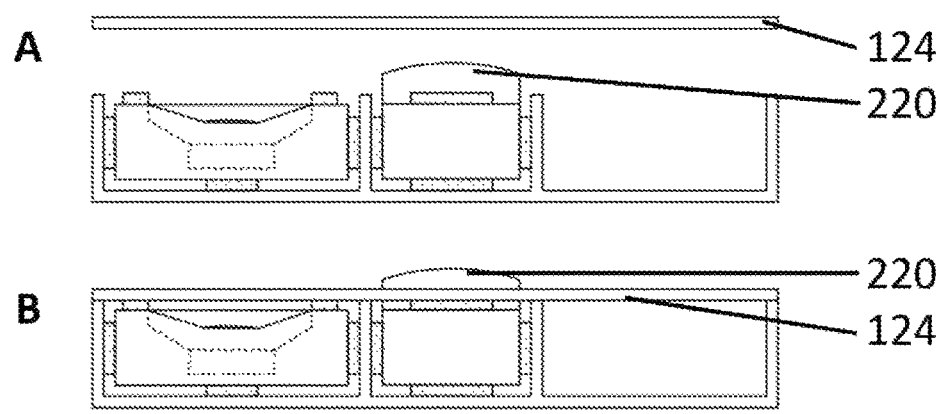
FIG. 8 is a cross-sectional view through the bridge of an electric guitar according to an embodiment of the present invention, showing exploded view (A) and assembled view (B).
Figure 9:
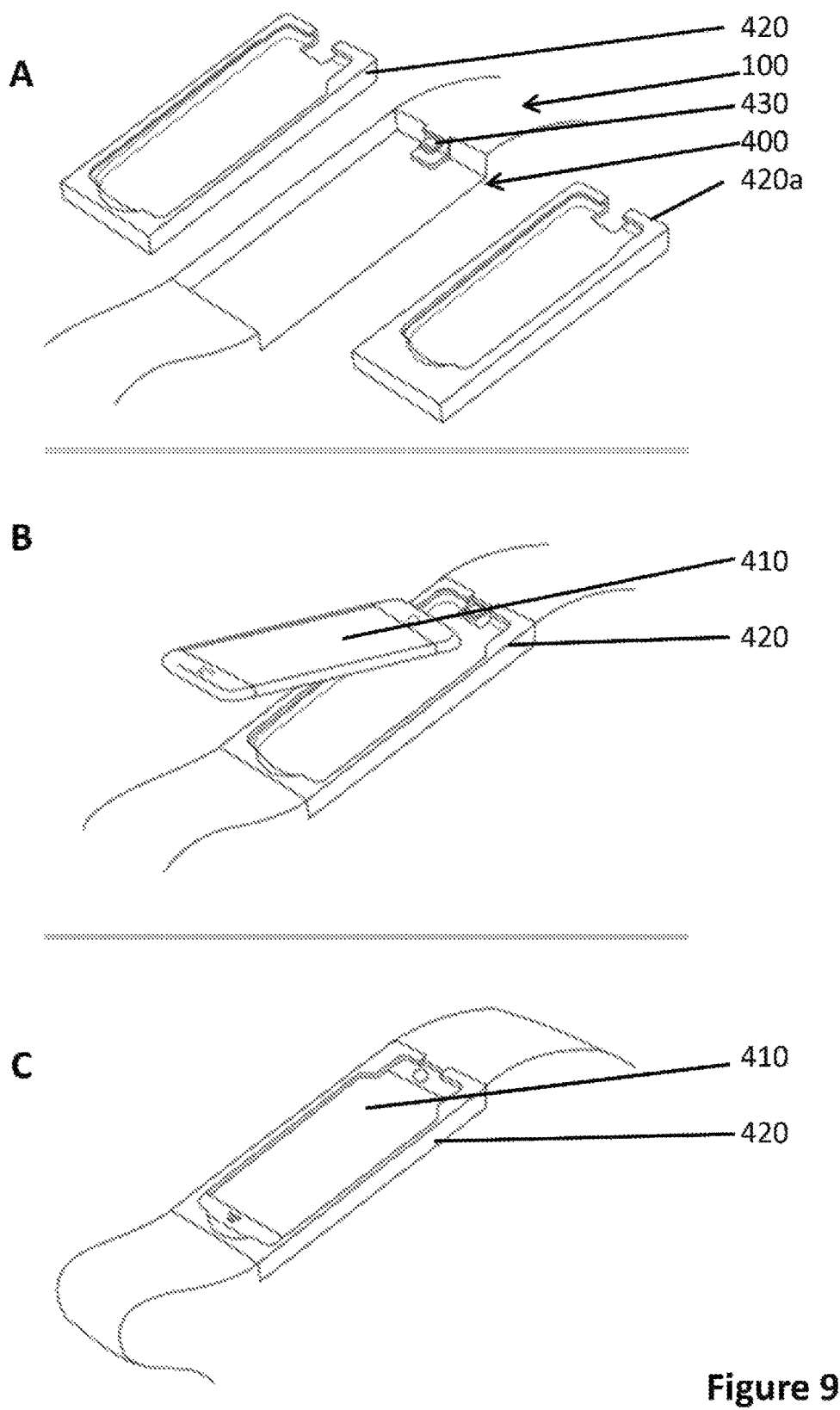
FIG. 9 shows details of a docking station as used in an electric guitar according, to the present invention. A. Exploded view. B. Insertion of smart device. C. Smart device in situ.

In use, the top of the bridge 220 sits outside and above the body portion lid 124, as illustrated in FIG. 8.

The neck sub-assembly 200 is not in direct contact with the body portion 120 at any point. The proximal end 201 of the neck sub-assembly 200 is held in place within the blind passage 300 by a vibration dampener 280. The vibration dampener 280 of the illustrated embodiment comprises an array of elastomeric support pads. The vibration dampener 280 may comprise, for example, polyurethane foam rubber, silicone foam or similar, natural or synthetic foam rubber. Alternatively, the vibration dampener 280 could be solid elastomeric material such as natural rubber or synthetic rubber for example ethylene propylene rubber, EPDM rubber, neoprene rubber, silicone rubber, thermoplastic elastomer, or thermoplastic polyurethane rubber. In the illustrated embodiment, the elastomeric support pads comprise a synthetic foam material with adhesive surfaces through which the body portion and neck sub-assembly may be joined substantially as illustrated. In alternative embodiments, the vibration dampener 280 could be one or more mechanical spring elements such as compression or extension springs made from plastic or metal or rubber. These components provide the required vibration isolation of the neck sub-assembly from the body's external shell, as discussed in further detail below.

Attached to and part of the neck sub-assembly 200 of the instrument are a string tuning mechanism 250 (which may be traditional guitar tuning pegs located at the distal end 202 of the neck sub-assembly 200), a pickup 230 and a bridge 220. In some embodiments, the individual strings may be tuned at the proximal end 201 of the neck sub-assembly 200 by the use of a rotary tuning mechanism 250. Such a tuning tailpiece is a metal or plastic component mechanically attached to the proximal end 201 of the neck sub-assembly 200 which contains features for attachment of both the bridge 220 and the rotary tuning mechanism 250. As in a standard electric guitar, the bridge 220 retains the strings in precise alignment with the frets 260 and at the correct length for intonation.

The neck sub-assembly 200 comprising the neck 205, bridge 220, strings, pickup 230 and tuners 250 is mechanically isolated from the body portion 120 and is only connected through a vibration dampener 280.

As for a standard electric guitar, there are attached to the neck 205, and placed just below the strings, one or more magnetic induction or piezo electric guitar pickups 230. These pickups may be in turn electrically connected to volume and tone controls. As in a standard electric guitar, the audio signal from these components may be connected to a jack socket 153 housed on the external shell of the body, into which a connector cable may be inserted in order to output the guitar signal directly to an external amplifier, instead of being processed by the smart device. In particular embodiments of the present invention, there may also be a line out jack 152 which allows connection of processed audio signals to be sent to an external amplifier.

Located on an outer surface of the body portion 120 is a smart device dock, or docking station, 400. The purpose of this dock 400 is to facilitate fitment and connection of multiple different types of smart devices 410.

The dock can have one or all of these functions:

To provide features which facilitate attachment of the smart device to the instrument.

To provide a connection to the smart device's data input/output connector socket.

To provide a charging connection facilitating charging of the smart device's battery using power from the instrument's battery pack.

In order that the instrument 100 is able to accommodate multiple different types of smart device 410, the parts of the dock 400 which are specific to the geometry and connector socket of the particular type of smart device 410 being connected are embodied in an adaptor 420 which can be disconnected and removed from the instrument 100. The user can then replace the adaptor 420 with an alternative adaptor version 420a suitable to the particular type of smart device 410 the user wishes to connect. This feature allows multiple different types of smart device 410 to be readily attached to the instrument 100. The dock 400 also includes a connector 430 which is suitable for the connecting with smart device 410.

Loudspeakers project sound waves outwards from their vibrating diaphragm. The volume or sound pressure level of these projected sound waves decreases (attenuates) as a function of distance from the loudspeaker (the sound level is inversely proportional to the square of the distance). The highest sound level for all frequencies is generally axially in line with the loudspeaker diaphragm and decreases in level as the off-axis angle increases. The decreases in level found at off-axis angles for varying frequencies is not consistent, low frequencies attenuate significantly less than high frequencies as the off-axis angle increases.

In a particular embodiment described herein, the axis of the main loudspeaker is pointing outwards approximately perpendicular to the front face of the guitar in order that the sound produced by the main loudspeaker is projected outwards to an audience. This orientation produces a problem for the player of the instrument; the player's head and ears are generally above and in line with the front face of the instrument. The player's ears are generally between 50 and 90 degrees off-axis from the loudspeaker diaphragm axis. As a consequence of the off-axis orientation the instrument player will hear the output sound of the loudspeakers with a significant reduction in the higher frequencies.

A particular embodiment described herein incorporates a second loudspeaker 140a incorporated into the body of the instrument to address this player-experienced reduction in the higher frequencies. The second loudspeaker 140a is preferably, oriented upwardly toward the head of the instrument player and will allow the player to experience the full spectrum of audio frequencies emitted by the instrument. The output of the second, upward projecting, loudspeaker 140a could be limited to just the mid-range and high frequencies which have been attenuated by the orientation of the players head relative to the main loudspeaker, or alternatively, this loudspeaker could produce an identical spectrum of frequencies to the main loudspeaker. The output volume of the second loudspeaker may also be adjustable by the use of an electrical volume control, baffles or orientation of the loudspeaker; so that the player can hear the instrument's output at a comfortable level.

As with the main loudspeaker(s), the second loudspeaker may be mounted in a speaker enclosure and project its sound to the instrument player through apertures in the guitar body. Further, the second loudspeaker may use its own speaker enclosure and include the same vibration attenuating materials as described for the main loudspeaker(s).

The inclusion of an amplifier and loudspeaker into the body of an electric stringed instrument poses a number of problems with instrument design. As discussed above, an electric stringed instrument generates sound by the movement of a metallic string relative to an electromagnetic pickup mounted on the instrument.

If the loudspeaker is mounted on and directly mechanically connected to the body of an electric stringed instrument such as a guitar, and the loudspeaker is used to amplify the sound of the vibrating strings, the significant problem of audio feedback can occur. The effect of this feedback is a howling sound.

Feedback may be generated by the sound waves emanating from the loudspeaker causing the strings to vibrate. This additional vibration of the strings will cause an additional sound output from the amplifier which will in turn be emitted from the loudspeaker. The additional sound will cause further vibration of the strings and will result in audio feedback.

A second way in which audio feedback is generated is when a loudspeaker is connected directly to the body of the electric stringed instrument and the loudspeaker is used to amplify the sound of the vibrating strings. The generation of soundwaves by the loudspeaker through the use of a vibrating diaphragm in turn induces vibrations in the body of the loudspeaker. These vibrations in the body of the loudspeaker will be transmitted to the body of the instrument and may be transmitted from the body of the instrument to the strings via the bridge. Alternatively, or additionally, the vibrations of the body of the instrument can result in vibration of the pickup which is mounted to the body of the instrument. In both cases, the result is vibration of the strings relative to the pickup. Again, this additional vibration will cause an additional sound output from the amplifier which will in turn be emitted from the loudspeaker. The additional sound will cause further vibration of the strings/pickup and will result in audio feedback.

One solution to attenuate feedback is to position the loudspeaker, or loudspeakers, in such a way as to direct the sound away from the strings of the instrument. Accordingly, in the illustrated embodiments there are no loudspeakers directed towards the strings of the instrument.

In preferred embodiments of the present invention, direct connection of a loudspeaker to the body of the instrument is avoided by incorporating a rubber damping pad between the loudspeaker body and the speaker housing and/or the body of the instrument, or between the speaker housing and the body of the instrument.

Attenuation of feedback caused by the vibrating pickup requires isolation of the pickup from the loudspeaker. Accordingly, a particular embodiment described herein incorporates not only the isolation of the loudspeaker from the body of the instrument, as described above, but also isolation of the pickup from the body of the instrument. In a particular embodiment described herein, the pickup is mechanically fastened to the neck assembly by means of screws or other types of fixings. The neck assembly is then held within, but not fixed to, the body of the instrument. Preferably, the neck assembly is held within the body of the instrument under compression with a vibration dampener such as a damping pad or isolation support. The purpose of this vibration dampener is to attenuate and/or absorb any vibrations generated by the loudspeaker to prevent them being transmitted to the pickup or strings, thereby attenuating any feedback loop. The vibration dampener may comprise, for example, polyurethane foam rubber, silicone foam or similar, natural or synthetic foam rubber. Alternatively the vibration dampener could be solid elastomeric material such as natural rubber or synthetic rubber for example ethylene propylene rubber, EPDM rubber, neoprene rubber, silicone rubber, thermoplastic elastomer, or thermoplastic polyurethane rubber.

The present invention also provides a method of assembling a stringed musical instrument comprising joining: (i) a substantially hollow body portion containing an audio system comprising an amplifier; at least one loudspeaker electrically connected to the audio amplifier; an audio interface for electrically connecting to a smart device and a power supply electrically connected to the audio system; and (ii) a neck sub-assembly including: a neck; playing strings extending lengthwise along the neck; a bridge attached to the neck over which the strings are stretched, and tensioning means by which the strings are held tensioned; wherein: a. a proximal end of the neck sub-assembly is substantially received within the body portion and connected thereto by a vibration dampener; and b. the loudspeaker is retained within a speaker housing and the speaker housing is connected to the body portion by a vibration dampener; and c. the vibration dampener comprises one or more resilient elastomeric pads. In particular embodiments, the vibration dampener comprises a material selected from the group consisting of: polyurethane foam rubber; silicone foam; natural or synthetic foam rubber; natural rubber; synthetic rubber; ethylene propylene rubber; EPDM rubber; neoprene rubber; silicone rubber; thermoplastic elastomer; and thermoplastic polyurethane rubber.

Whilst the above description includes particular embodiments of the invention, it is to be understood that many variations, alterations, modifications and/or additions may be introduced into the constructions and arrangements of parts previously described without departing from the essential features or the spirit or ambit of the invention.

The invention claimed is:

1. A stringed musical instrument comprising:
    a substantially hollow body portion containing an audio system comprising an amplifier; at least one loudspeaker electrically connected to the audio amplifier; an audio interface for electrically connecting to a smart device and a power supply electrically connected to the audio system;
    a neck sub-assembly including: a neck; playing strings extending lengthwise along the neck; a bridge attached to the neck over which the strings are stretched, and tensioning means by which the strings are held tensioned; and
    a docking station whereby, in use, a smart device may be removably secured to the instrument and electrically connected to the audio system;
    wherein the neck sub-assembly extends substantially into the body portion and is connected thereto by a first vibration dampener.

2. The musical instrument according to claim 1, wherein the loudspeaker is retained within and connected to the body portion by a second vibration dampener.

3. The musical instrument according to claim 2, wherein each of the vibration dampeners comprises one or more resilient elastomeric pads.

4. The musical instrument according to claim 2, wherein the each of the vibration dampeners independently comprises a material selected from the group consisting of: polyurethane foam rubber; silicone foam; natural or synthetic foam rubber; natural rubber; synthetic rubber; ethylene propylene rubber; EPDM rubber; neoprene rubber; silicone rubber; thermoplastic elastomer; and thermoplastic polyurethane rubber.

5. The musical instrument according to claim 1, wherein the loudspeaker is retained within a speaker housing and the speaker housing is connected to the body portion by a second vibration dampener.

6. The musical instrument according to claim 5, wherein each of the vibration dampeners comprises one or more resilient elastomeric pads.

7. The musical instrument according to claim 5, wherein each of the vibration dampeners comprises a material selected from the group consisting of: polyurethane foam rubber; silicone foam; natural or synthetic foam rubber; natural rubber; synthetic rubber; ethylene propylene rubber; EPDM rubber; neoprene rubber; silicone rubber; thermoplastic elastomer; and thermoplastic polyurethane rubber.

8. The musical instrument according to claim 1, wherein the docking station comprises a recess in an outer wall of the body portion.

9. The musical instrument according to claim 8, wherein the docking station comprises an adaptor an outer surface of which locks into the recess and an inner surface of which is engageable with the smart device.

10. The musical instrument according to claim 1, wherein the first vibration dampener comprises one or more resilient elastomeric pads.

11. The musical instrument according to claim 1, wherein the first vibration dampener comprises a material selected from the group consisting of: polyurethane foam rubber; silicone foam; natural or synthetic foam rubber; natural rubber; synthetic rubber; ethylene propylene rubber; EPDM rubber; neoprene rubber; silicone rubber; thermoplastic elastomer; and thermoplastic polyurethane rubber.

12. The musical instrument according to claim 1, wherein the audio interface connects to the smart device via wireless means.

13. The musical instrument according to claim 1, being a portable electric guitar.

14. A method of assembling a stringed musical instrument comprising joining:
    a substantially hollow body portion containing an audio system comprising an amplifier; at least one loudspeaker electrically connected to the audio amplifier; an audio interface for electrically connecting to a smart device and a power supply electrically connected to the audio system; and
    a neck sub-assembly including: a neck; playing strings extending lengthwise along the neck; a bridge attached to the neck over which the strings are stretched, and tensioning means by which the strings are held tensioned;
    wherein:

a. a proximal end of the neck sub-assembly is substantially received within the body portion and connected thereto by a first vibration dampener, wherein the first vibration dampener comprises one or more resilient elastomeric pads; and b. the loudspeaker is retained within a speaker housing and the speaker housing is connected to the body portion by a second vibration dampener, wherein the second vibration damper comprises one or more resilient elastomeric pads.

15. The method according to claim 14, wherein each of the vibration dampeners independently comprises a material selected from the group consisting of: polyurethane foam rubber; silicone foam; natural or synthetic foam rubber; natural rubber; synthetic rubber; ethylene propylene rubber; EPDM rubber; neoprene rubber; silicone rubber; thermoplastic elastomer; and thermoplastic polyurethane rubber.

\* \* \* \* \*